US012294845B2

(12) United States Patent
Xu et al.

(10) Patent No.: US 12,294,845 B2
(45) **Date of Patent: *May 6, 2025**

(54) PACKAGE STRUCTURE OF MICRO SPEAKER

(71) Applicant: Fortemedia, Inc., Santa Clara, CA (US)

(72) Inventors: Yu-Xuan Xu, Hsinchu (TW); Li-Jen Chen, Hsinchu (TW); Yu-Ting Cheng, New Taipei (TW); Shih-Chin Gong, Taipei (TW)

(73) Assignee: FORTEMEDIA, INC., Alviso, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,105

(22) Filed: Jul. 1, 2022

(65) Prior Publication Data

US 2024/0007793 A1 Jan. 4, 2024

(51) Int. Cl.
*H04R 7/02* (2006.01)

(52) U.S. Cl.
CPC .................................... *H04R 7/02* (2013.01)

(58) Field of Classification Search
CPC ................ H04R 7/02; H04R 2231/003; H04R 2307/204; H04R 7/04; H04R 7/10; H04R 2231/001
USPC .................. 381/423, 386; 181/148, 160, 164
See application file for complete search history.

(56) References Cited

U.S. PATENT DOCUMENTS 6,957,714 B2 * 10/2005 Takahashi ................ H04R 7/20 181/173
7,142,688 B2 * 11/2006 Croft, III ............... H04R 9/047 381/399
7,699,139 B2 * 4/2010 Subramaniam .......... H04R 7/20 181/171
8,199,962 B2 * 6/2012 Maeda ..................... H04R 7/02 181/173
10,609,489 B2 * 3/2020 Guthy ....................... H04R 9/06
(Continued)

FOREIGN PATENT DOCUMENTS

CN 106454659 A * 2/2017 ............. H04R 31/00
WO WO-2015178760 A1 * 11/2015 ............. H04R 31/00

OTHER PUBLICATIONS

Je et. al., “An electromagnetically actuated microspeaker with fully-integrated wax-bonded Nd—Fe—B micromagnets for hearing aid applications,” TRANSDUCERS 2009—2009 International Solid-State Sensors, Actuators and Microsystems Conference, pp. 885-888, doi: 10.1109/SENSOR.2009.5 (Year: 2009).*
Machine Translation of CN 106454659 A (Year: 2017).*
1 TW Office Action dated Jun. 20, 2023 in Taiwan application No. 111131224.

*Primary Examiner* — Forrest M Phillips
*Assistant Examiner* — Jennifer B. Olson
(74) *Attorney, Agent, or Firm* — McClure, Qualey & Rodack, LLP

(57) ABSTRACT

A package structure of a micro speaker is provided. The package structure includes a substrate having a hollow chamber, a diaphragm suspended over the hollow chamber, a coil embedded in the diaphragm, a carrier board disposed on a bottom surface of the substrate, a first permanent magnetic element disposed on the carrier board and in the hollow chamber, and a lid wrapped around the substrate and the diaphragm. The diaphragm includes an etching pattern. One end of the lid exposes a portion of the top surface of the diaphragm.

20 Claims, 17 Drawing Sheets

(56) References Cited

U.S. PATENT DOCUMENTS

| | | | | |
|---|---|---|---|---|
| 11,665,484 | B2 * | 5/2023 | Chen | H04R 9/025<br>381/19 |
| 2001/0005419 | A1 * | 6/2001 | Kermani | H04R 7/04<br>381/189 |
| 2006/0239494 | A1 * | 10/2006 | Kimura | H04R 7/127<br>381/386 |
| 2018/0152788 | A1 * | 5/2018 | Perletti | H04R 7/18 |
| 2022/0030358 | A1 * | 1/2022 | Devantier | H04R 9/06 |
| 2022/0141595 | A1 | 5/2022 | Chen et al. | |
| 2022/0340409 | A1 * | 10/2022 | Fu | H04R 13/00 |

* cited by examiner

PACKAGE STRUCTURE OF MICRO SPEAKER

BACKGROUND OF THE DISCLOSURE

Field of the Disclosure

The disclosure relates to a micro speaker, and more particularly to a package structure of a micro speaker and methods for forming the same.

Description of the Related Art

Since electronic products are becoming smaller and thinner, how to scale down the size of electronic products has become an important topic. Micro electromechanical system (MEMS) technology is a technology that combines semiconductor processing and mechanical engineering, which can effectively reduce the size of components and produce multi-functional micro elements and micro systems.

At present, there are quite a few products that are manufactured using micro electromechanical system, such as micro accelerometers, micro gyros, micro magnetometers, and sensors. The manufacturing of traditional moving coil speakers has become quite mature, but the traditional moving coil speakers have a larger area and are more expensive. If the micro electromechanical system process is used to manufacture a moving coil speaker on a semiconductor chip, the area will be reduced and the cost will be reduced, which is conducive to batch production. However, in addition to reducing the size to facilitate manufacturing, it is still necessary to develop a micro moving coil speaker with better frequency response.

BRIEF SUMMARY OF THE DISCLOSURE

A package structure of a micro speaker is provided in some embodiments. The package structure includes a substrate having a hollow chamber, a diaphragm suspended over the hollow chamber, a coil embedded in the diaphragm, a carrier board disposed on the bottom surface of the substrate, a first permanent magnetic element disposed on the carrier board and in the hollow chamber, and a lid wrapped around the substrate and the diaphragm. The diaphragm includes an etching pattern. One end of the lid exposes a portion of the top surface of the diaphragm.

In some embodiments, the diaphragm includes polydimethylsiloxane (PDMS), phenolic epoxy resin, polyimide, or a combination thereof.

In some embodiments, the diaphragm is light-sensitive.

In some embodiments, the diaphragm is not light-sensitive.

In some embodiments, the carrier board includes an air hole, and the air hole allows the hollow chamber to communicate with the external environment.

In some embodiments, the lid includes a metal with magnetic permeability that is lower than $1.25 \times 10^{-4}$ H/m.

In some embodiments, the package structure of the micro speaker further includes a second permanent magnetic element disposed under the end of the lid.

In some embodiments, the Young's modulus of the diaphragm is between 1 MPa and 100 GPa.

In some embodiments, the thickness of the diaphragm is between 0.1 μm and 20 μm.

In some embodiments, the coil includes a first metal layer and a second metal layer, and the first metal layer is electrically connected to the second metal layer in the opening of the diaphragm.

In some embodiments, the first metal layer and the second metal layer each includes aluminum silicon, aluminum, copper, or a combination thereof.

In some embodiments, the width of the first metal layer and the width of the second metal layer are between 1 μm and 500 μm, and the thickness of the first metal layer and the thickness of the second metal layer are between 0.1 μm and 20 μm.

In some embodiments, the first metal layer includes a spiral structure surrounding the central axis of the diaphragm, and the second metal layer crosses the spiral structure and is electrically connected to the first metal layer.

In some embodiments, the etching pattern may be teardrop-shaped or it may be slit-shaped.

In some embodiments, the etching pattern is thinner than the diaphragm.

A package structure of a micro speaker is provided in some embodiments. The package structure includes a substrate having a hollow chamber, a diaphragm suspended over the hollow chamber, a coil embedded in the diaphragm and including a first metal layer and a second metal layer, an etch stop layer overlapping at least a portion of the first metal layer and the second metal layer, a carrier board disposed on the bottom surface of the substrate, a first permanent magnetic element disposed on the carrier board and in the hollow chamber, and a lid wrapped around the substrate and the diaphragm. The diaphragm includes an etching pattern. One end of the lid exposes a portion of the top surface of the diaphragm.

A package structure of a micro speaker is provided in some embodiments. The package structure includes a substrate having a hollow chamber, a diaphragm suspended over the hollow chamber, a coil embedded in the diaphragm, a carrier board disposed on the bottom surface of the substrate, a first permanent magnetic element disposed on the carrier board and in the hollow chamber, a lid wrapped around the substrate and the diaphragm, and a second permanent magnetic element disposed on the lid of the diaphragm. The diaphragm includes an etching pattern. One end of the lid exposes a portion of the top surface of the diaphragm.

BRIEF DESCRIPTION OF THE DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

DETAILED DESCRIPTION OF THE DISCLOSURE

Figure 1A:
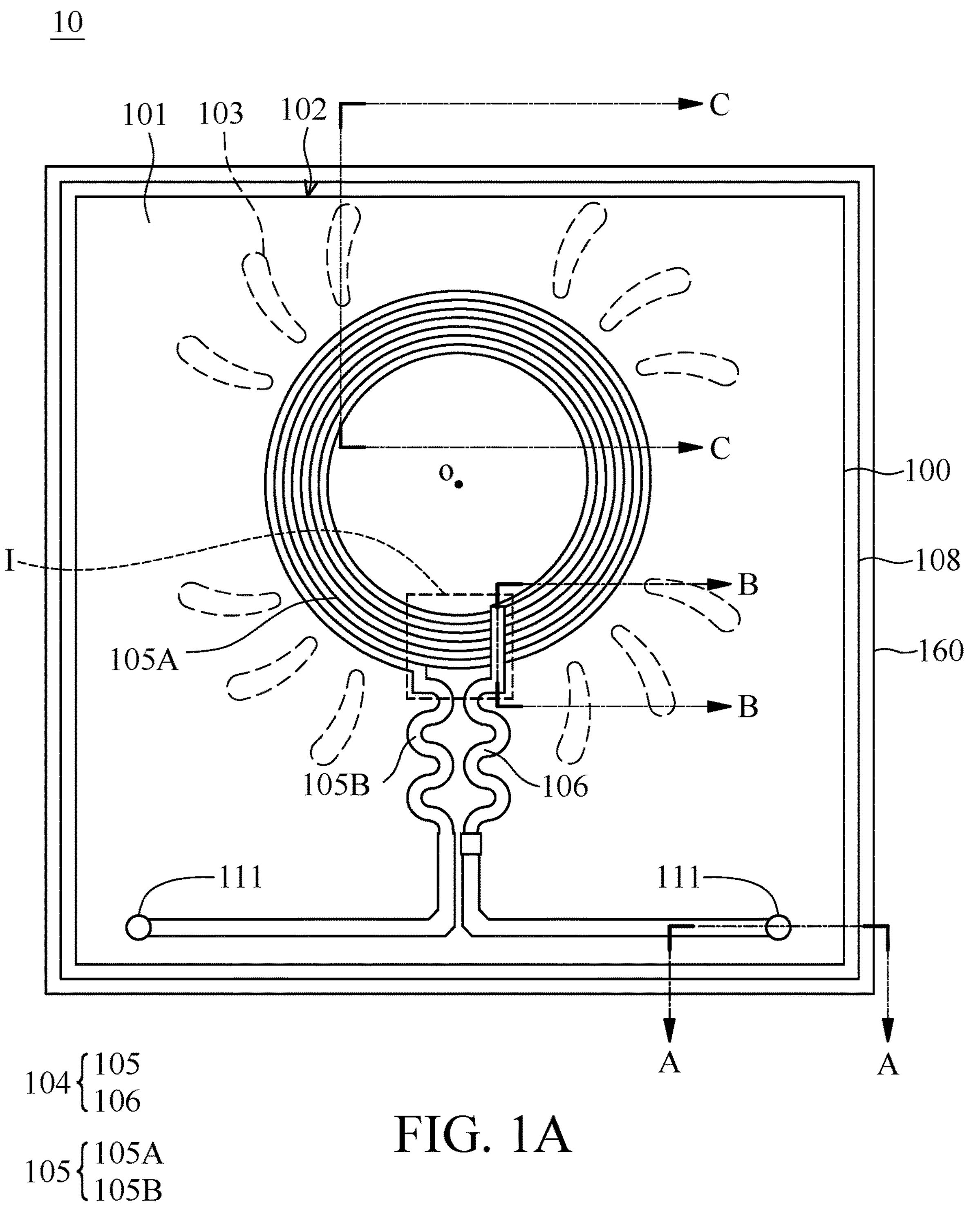
FIG. 1A illustrates a top view of an exemplary package structure of a micro speaker according to some embodiments of the present disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first layer disposed on a second layer", may indicate not only the direct contact of the first layer and the second layer, but also a non-contact state with one or more intermediate layers between the first layer and the second layer. In the above situation, the first layer may not directly contact the second layer.

In addition, the present disclosure may repeat reference numerals and/or letters in the various examples. This repetition is for the purpose of simplicity and clarity and does not in itself dictate a relationship between the various embodiments and/or configurations discussed. Some variations of embodiments are described below. In different figures and illustrated embodiments, similar element symbols are used to indicate similar elements.

The drawings provided are only schematic diagrams and are non-limiting. In the drawings, the size, shape, or thickness of some of the elements may be exaggerated and not drawn to scale, for illustrative purposes. The dimensions and the relative dimensions do not correspond to actual location in the practice of the disclosure. The disclosure will be described with respect to particular embodiments and with reference to certain drawings, but the disclosure is not limited thereto.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

When a number or a range of numbers is described with "about," "approximate," and the like, the term is intended to encompass numbers that are within a reasonable range including the number described, such as within +/− 10% of the number described or other values as understood by person skilled in the art. For example, the term "about 5 nm" encompasses the dimension range from 4.5 nm to 5.5 nm.

Furthermore, the use of ordinal terms such as "first", "second", "third", etc., in the disclosure to modify an element does not by itself connote any priority, precedence, or order of one claim element over another or the temporal order in which it is formed, but are used merely as labels to distinguish one claim element having a certain name from another element having the same name (but for use of the ordinal term) to distinguish the claim elements.

The term "permanent magnetic element" used in the present disclosure refers to an element that can maintain magnetism for a long time. That is, the permanent magnetic element is not easy to lose magnetism and is not easy to be magnetized. In addition, permanent magnetic elements can also be referred to as "hard magnetic elements."

Some embodiments of the present disclosure provide a package structure of a micro speaker. Etching pattern may be provided on the diaphragm of the micro speaker to change the characteristic of the diaphragm, such as the stress in different positions, so the sensitivity of the micro speaker may be enhanced.

FIG. 1A illustrates a top view of an exemplary package structure 10 of a micro speaker according to some embodiments of the present disclosure. As shown in FIG. 1A, the package structure 10 of the micro speaker includes a substrate 100, a diaphragm 102, a multilayer coil 104, a lid 108 and a carrier board 160. It should be noted that in the embodiment shown in FIG. 1A, in order to show the internal structure of the package structure 10 of the micro speaker, the diaphragm 102 and the lid 108 are only represented by rectangles.

Figure 1B:
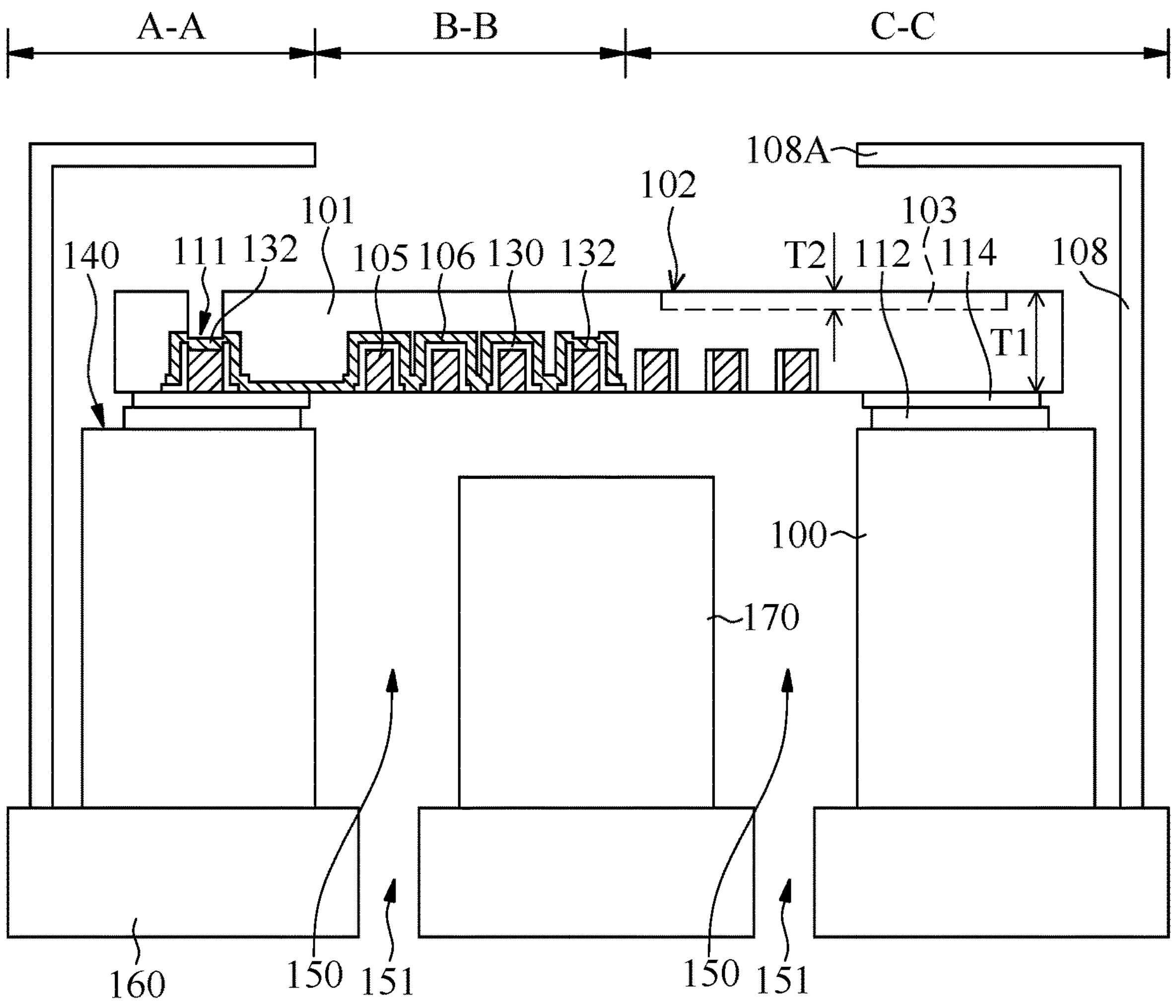
FIG. 1B illustrates a cross-sectional view of an exemplary package structure of a micro speaker according to some embodiments of the present disclosure.

FIG. 1B illustrates the cross-sectional view of the package structure 10 of the micro speaker shown in FIG. 1A according to some embodiments of the present disclosure. As shown in FIG. 1B, the first permanent magnetic element 170 is disposed below the diaphragm 102. The first permanent magnetic element 170 improves the frequency response of the diaphragm 102. It should be noted that, in order to simplify the figure, FIG. 1A does not show the first permanent magnetic element 170.

Referring to FIGS. 1A and 1B, the diaphragm 102 is disposed on the substrate 100 and can vibrate up and down in the normal direction of the substrate 100. The multilayer coil 104 is embedded in the diaphragm 102. That is, the multilayer coil 104 is not exposed. The multilayer coil 104 is configured to transmit electrical signals and drive the diaphragm 102 to deform relative to the substrate 100 according to the electrical signals. At present, resistances of speakers are mostly 8Ω or 32Ω, which is lower than that of single-layer coils. The multilayer coils of the present disclosure can easily meet the resistance requirements. In some embodiments, the diaphragm 102 may include a main body 101 and an etching pattern 103 on the main body 101. The etching pattern 103 may be a pattern etched from a surface (e.g. top surface) of the diaphragm 102 for changing the characteristic of the diaphragm 102 to enhance the sensitivity of the package structure 10 of the micro speaker. In some embodiments, the etching pattern 103 may overlap the multilayer coil 104. In some embodiments, etching pattern 103 may not overlap the multilayer coil 104, depending on design requirement.

In some embodiments, the etching pattern 103 does not pass through the entire main body 101 to ensure the diaphragm 102 still remains a certain mechanical strength. For example, the main body 101 has a thickness T1, the etching pattern 103 has a thickness T2, and the thickness T1 may be greater than the thickness T2. In some embodiments, the thickness T1 may be in a range between about 0.1 μm and about 20 μm.

The multilayer coil 104 includes a first metal layer 105 and a second metal layer 106. The first metal layer 105 is electrically connected to the second metal layer 106 in an opening 111 of the diaphragm 102 to transmit electrical signals and control the operation of the package structure 10 of the micro speaker.

In some embodiments, the first metal layer 105 includes a spiral structure 105A located in the center of the diaphragm 102 and a wavy structure 105B extending from the spiral structure 105A to the periphery of the diaphragm 102. The spiral structure 105A surrounds the central axis O of the diaphragm 102, and the wavy structure 105B connects the spiral structure 105A to the opening 111. By providing the wavy structure 105B, the diaphragm 102 can be more flexible and the difficulty of vibration can be reduced.

Figure 2:
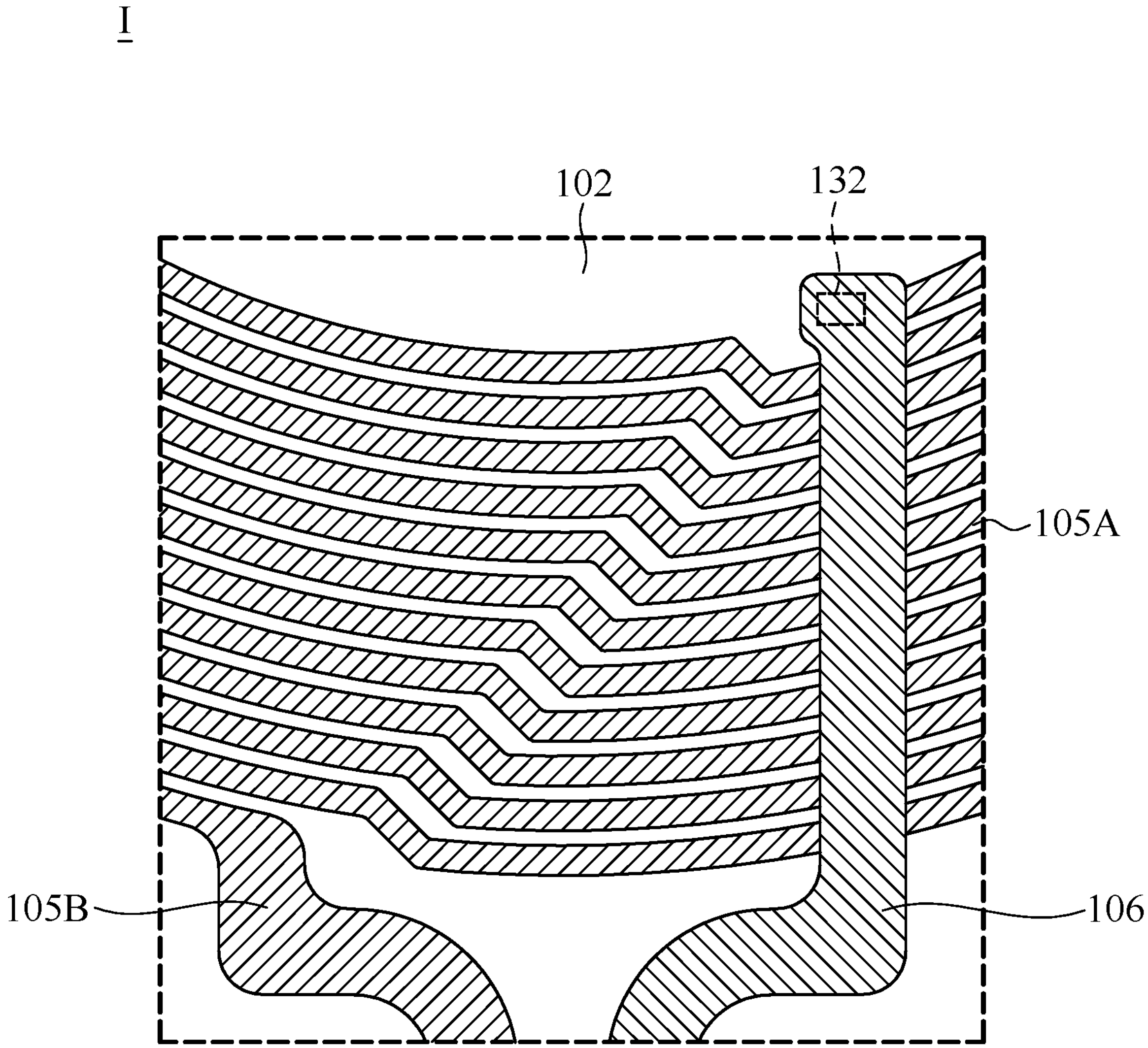
FIG. 2 illustrates an enlarged schematic diagram of the area I shown in FIG. 1A according to some embodiments of the present disclosure.

FIG. 2 illustrates an enlarged schematic diagram of the area I shown in FIG. 1A according to some embodiments of the present disclosure. Referring to FIGS. 1B and 2, the first metal layer 105 and the second metal layer 106 are located on different levels, and the second metal layer 106 is higher than the first metal layer 105. That is, the second metal layer 106 is closer to the top of the diaphragm 102 than the first metal layer 105.

A dielectric layer 130 is disposed between the first metal layer 105 and the second metal layer 106 to prevent a short circuit between the first metal layer 105 and the second metal layer 106. A via hole 132 is formed in the dielectric layer 130. The second metal layer 106 crosses the spiral structure 105A and is electrically connected to the first metal layer 105 through the via hole 132. The process of manufacturing the package structure 10 is described in detail below in conjunction with FIGS. 3A to 3F.

FIGS. 3A to 3F show schematic cross-sectional views of the package structure 10 shown in FIG. 1 during the manufacturing process. It should be understood that each of FIGS. 3A to 3F includes a cross-sectional view along the lines A-A, B-B, and C-C shown in FIG. 1. In this way, the manufacturing processes of different parts of the package structure 10 can be shown in a single figure.

Figure 3A:
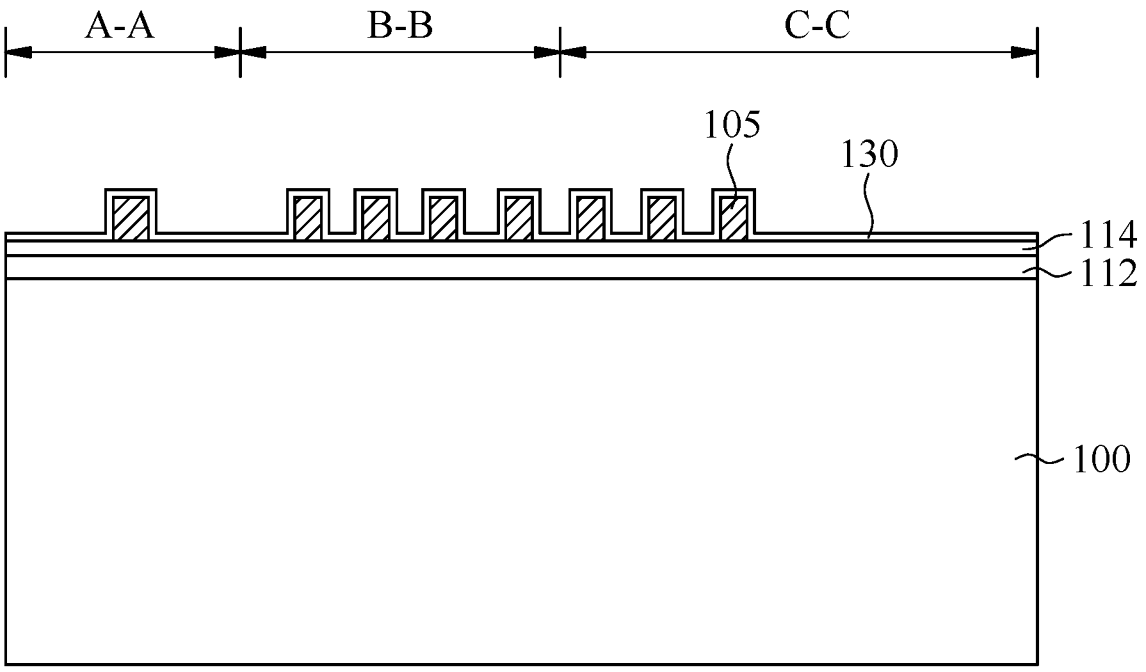
FIG. 3A to FIG. 3F illustrate cross-sectional views of a packaging structure of a micro speaker at intermediate stages of manufacturing according to some embodiments of the present disclosure.

Referring to FIG. 3A, dielectric layers 112 and 114 are formed on the substrate 100. In some embodiments, the substrate 100 may be part of a semiconductor wafer. In some embodiments, the substrate 100 may be formed of silicon (Si) or other semiconductor materials. Alternatively or additionally, the substrate 100 may include other element semiconductor materials, such as germanium (Ge). In some embodiments, the substrate 100 may be formed of a compound semiconductor, such as silicon carbide (SiC), gallium arsenide (GaAs), indium arsenide (InAs), or indium phosphide (InP). In some embodiments, the substrate 100 may be formed of an alloy semiconductor, such as silicon germanium (SiGe), silicon germanium carbide (SiGeC), gallium arsenide phosphide (GaAsP), or indium gallium phosphide (InGaP). In some embodiments, the thickness of the substrate 100 may be between about 100 μm and about 1000 μm.

In some embodiments, the dielectric layer 112 may be silicon dioxide ($SiO_2$) or other oxides or nitrides that can be used as a dielectric layer. The dielectric layer 112 may be formed on the substrate 100 through thermal oxidation, chemical vapor deposition (CVD), low pressure CVD (LPCVD), atmospheric pressure CVD (APCVD), plasma-enhanced chemical vapor deposition (PECVD), or a combination thereof.

In some embodiments, the dielectric layer 114 may be silicon dioxide ($SiO_2$) or other oxides or nitrides that can be used as a dielectric layer. The dielectric layer 114 may be formed on the dielectric layer 112 through thermal oxidation, chemical vapor deposition (CVD), plasma-enhanced chemical vapor deposition (PECVD), or a combination thereof.

Still referring to FIG. 3A, the first metal layer 105 of the multilayer coil 104 is formed on the dielectric layer 114. The first metal layer 105 may be formed through electroplating or physical vapor deposition (PVD), such as sputtering or evaporation coating. Then, the first metal layer 105 is patterned to form the spiral structure 105A and the wavy structure 105B as shown in FIG. 1. The patterning process may include photolithography processes (for example, photoresist coating, soft baking, mask alignment, exposure, post-exposure baking, photoresist development, other suitable processes or a combination thereof), etching processes (for example, wet etching process, dry etching process, other suitable processes or a combination thereof), other suitable processes, or a combination thereof.

In some embodiments, the first metal layer 105 may include aluminum silicon, aluminum, copper, or a combination thereof. In some embodiments, the width of the first metal layer 105 may be between 1 μm and 500 μm, and the thickness of the first metal layer 105 may be between 0.1 μm and 20 μm.

Still referring to FIG. 3A, a dielectric layer 130 is formed on the first metal layer 105 and the dielectric layer 114. In some embodiments, the dielectric layer 130 may be formed through a furnace process or a chemical vapor deposition process. In some embodiments, the dielectric layer 130 may be carbon-doped oxides or other suitable insulating materials.

Figure 3B:
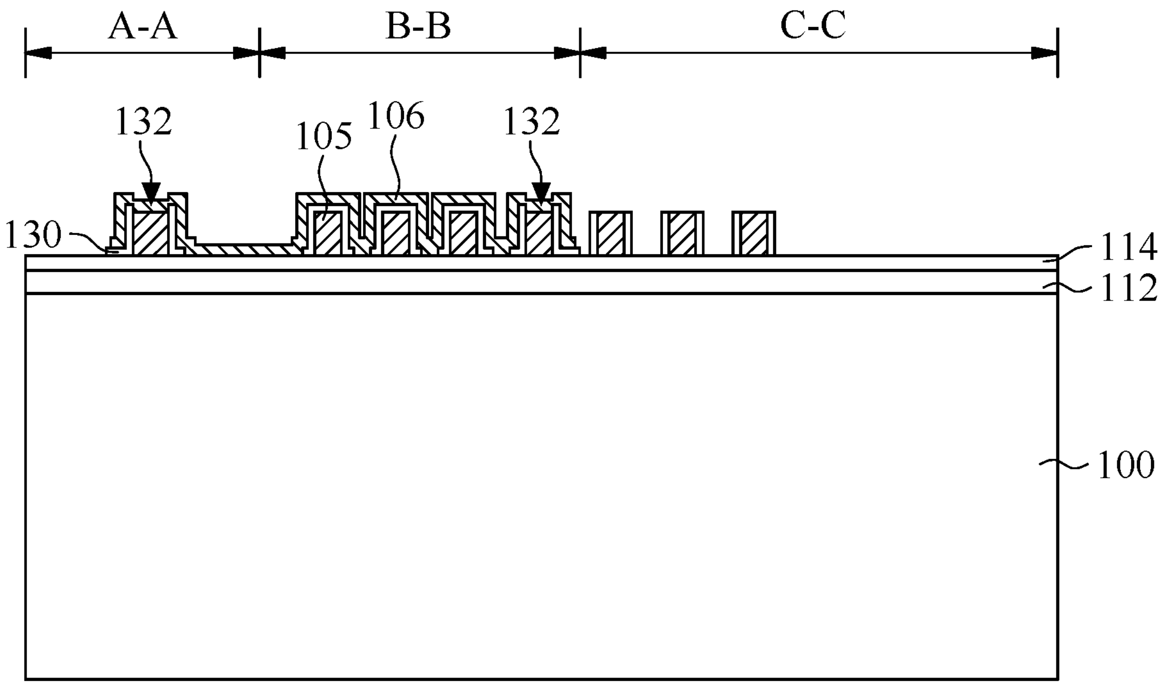

Referring to FIG. 3B, a lithography process and an etching process are performed on the dielectric layer 130 to form a via hole 132 in the dielectric layer 130 and expose a portion of the first metal layer 105. Then, the second metal layer 106 of the multilayer coil 104 is formed on the dielectric layer 130 and the first metal layer 105 through electroplating or physical vapor deposition (for example, sputtering or evaporation coating). The second metal layer 106 is subsequently patterned. It should be noted that the dielectric layer 130 is cut into separate segments through the lithography process and etching process, leaving only the necessary portion to insulate the first metal layer 105 and the second metal layer 106. By removing unnecessary portion of the dielectric layer 130, the diaphragm 102 can be more flexible and thus improve the performance of the package structure.

In some embodiments, the second metal layer 106 may include aluminum silicon, aluminum, copper, or a combination thereof. In some embodiments, the width of the second metal layer 106 may be between 1 μm and 500 μm, and the thickness of the second metal layer 106 may be between 0.1 μm and 20 μm.

Figure 3C:
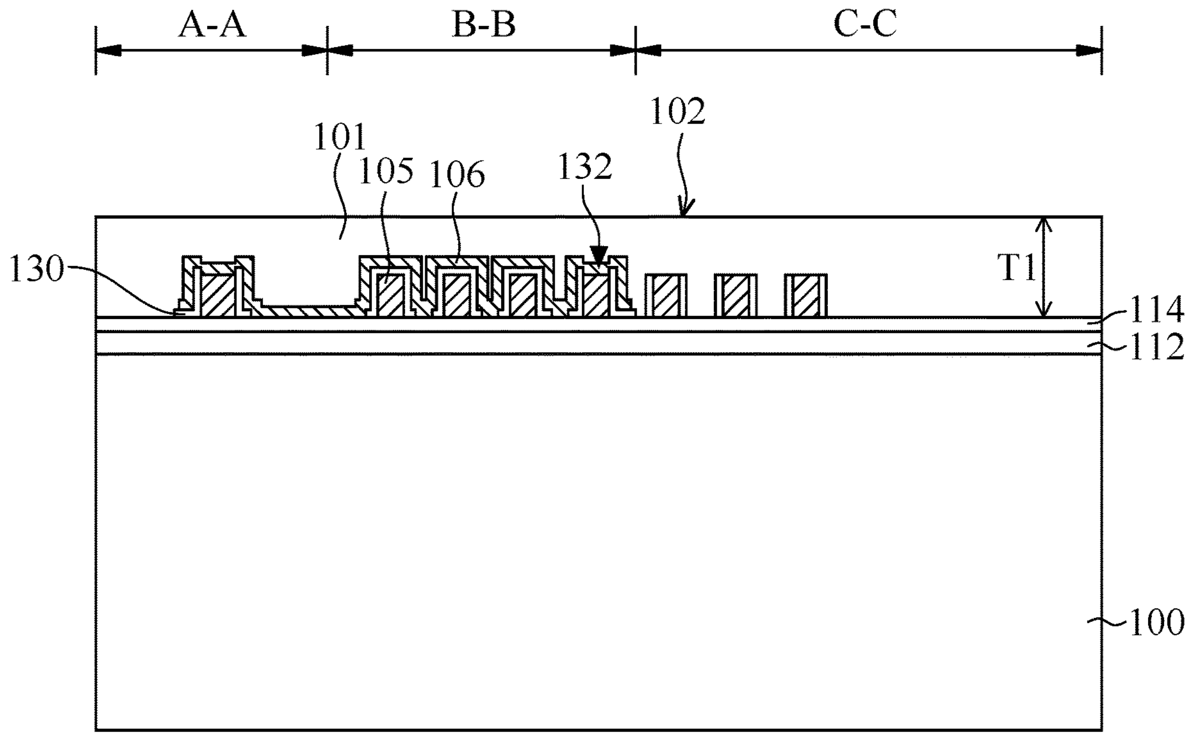

Referring to FIG. 3C, the diaphragm 102 is formed on the second metal layer 106. In some embodiments, the diaphragm 102 may be formed through spin coating, slot-die coating, blade coating, wire bar coating, gravure coating, spray coating, chemical vapor deposition, other suitable methods, or a combination thereof. As shown in FIG. 3C, the first metal layer 105, the second metal layer 106, and the dielectric layer 130 are embedded in the diaphragm 102. In some embodiments, the diaphragm 102 may include polydimethylsiloxane (PDMS), phenolic epoxy resin (such as SU-8), polyimide (PI), or a combination thereof. In one embodiment, the diaphragm 102 is formed of PDMS, and the Young's modulus of the diaphragm 102 is between 1 MPa and 100 GPa. Compared with a film formed of polyimide, the diaphragm 102 formed of PDMS has a smaller Young's modulus and a softer film structure, which makes the diaphragm 102 have a larger displacement, thereby generates a larger sound amplitude.

Figure 3D:
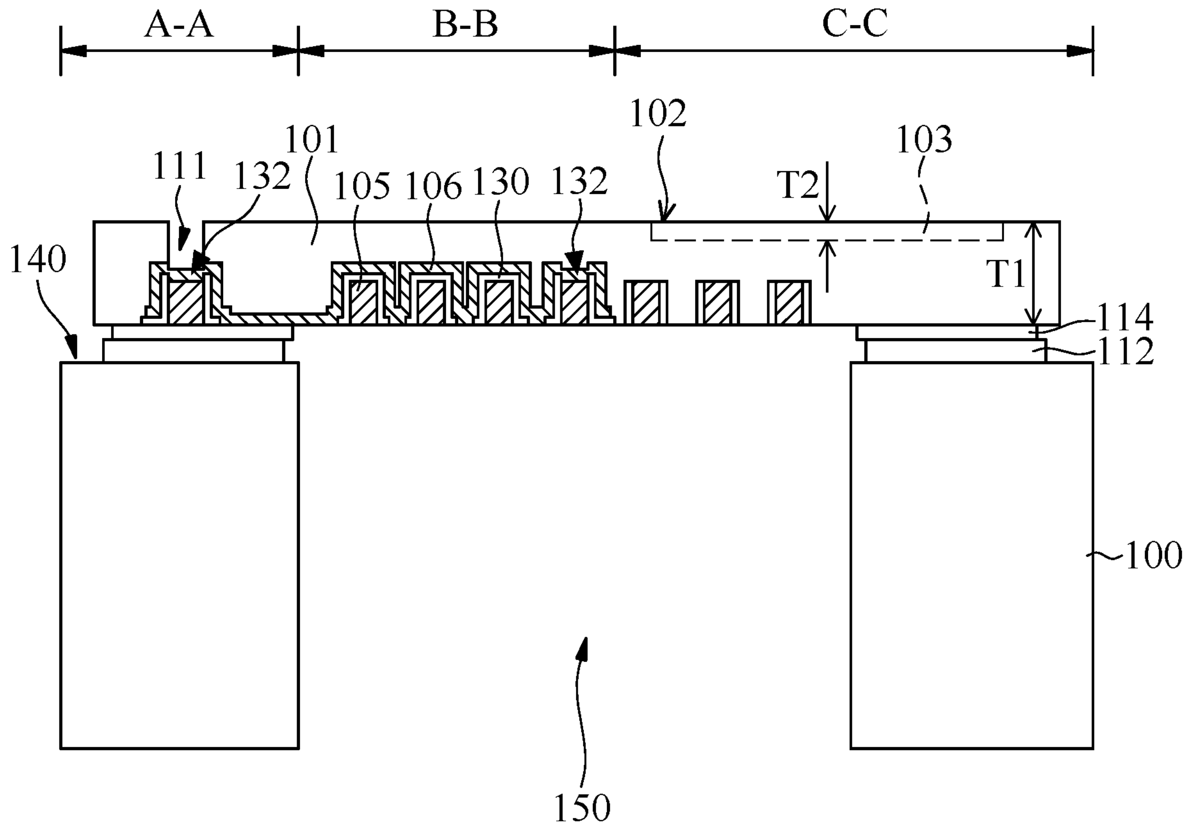

Referring to FIG. 3D, the diaphragm 102 is patterned to form an opening 111 in the diaphragm 102, forming the etching pattern 103 on the main body 101, and a cutting channel 140 is formed around the diaphragm 102. The opening 111 may expose the second metal layer 106. The first metal layer 105 is electrically connected to the second metal layer 106 in the opening 111. The cutting channel 140 may define an area of each package structure on the wafer. In this way, the cutting channel 140 may facilitate cutting (for example, laser cutting) to separate the package structure. In some embodiments, the diaphragm 102 may be light-sensitive or not light-sensitive.

Still referring to FIG. 3D, a deep reactive-ion etching process or an etching process which applies an etchant (such as ammonium hydroxide ($NH_4OH$), hydrofluoric acid (HF), deionized water, tetramethylammonium hydroxide (TMAH), potassium hydroxide (KOH)) is performed on the substrate 100 to form a hollow chamber 150 in the substrate 100. As shown in FIG. 3D, the diaphragm 102 is suspended over the hollow chamber 150. It should be noted that the dielectric layers 112 and 114 may be used as etch stop layers to protect the diaphragm 102 and the multilayer coil 104 from being etched. For example, the dielectric layers 112 and 114 may overlap at least a portion of the first metal layer 105 and the second metal layer 106, such as under the first metal layer 105 and the second metal layer 106. Since the etching rates of the dielectric layers 112 and 114 may be different, after the etching process, the dielectric layers 112 and 114 may not completely overlap. For example, the dielectric layer 112 may shrink to form a trough on the side facing the hollow chamber 150.

Figure 3E:
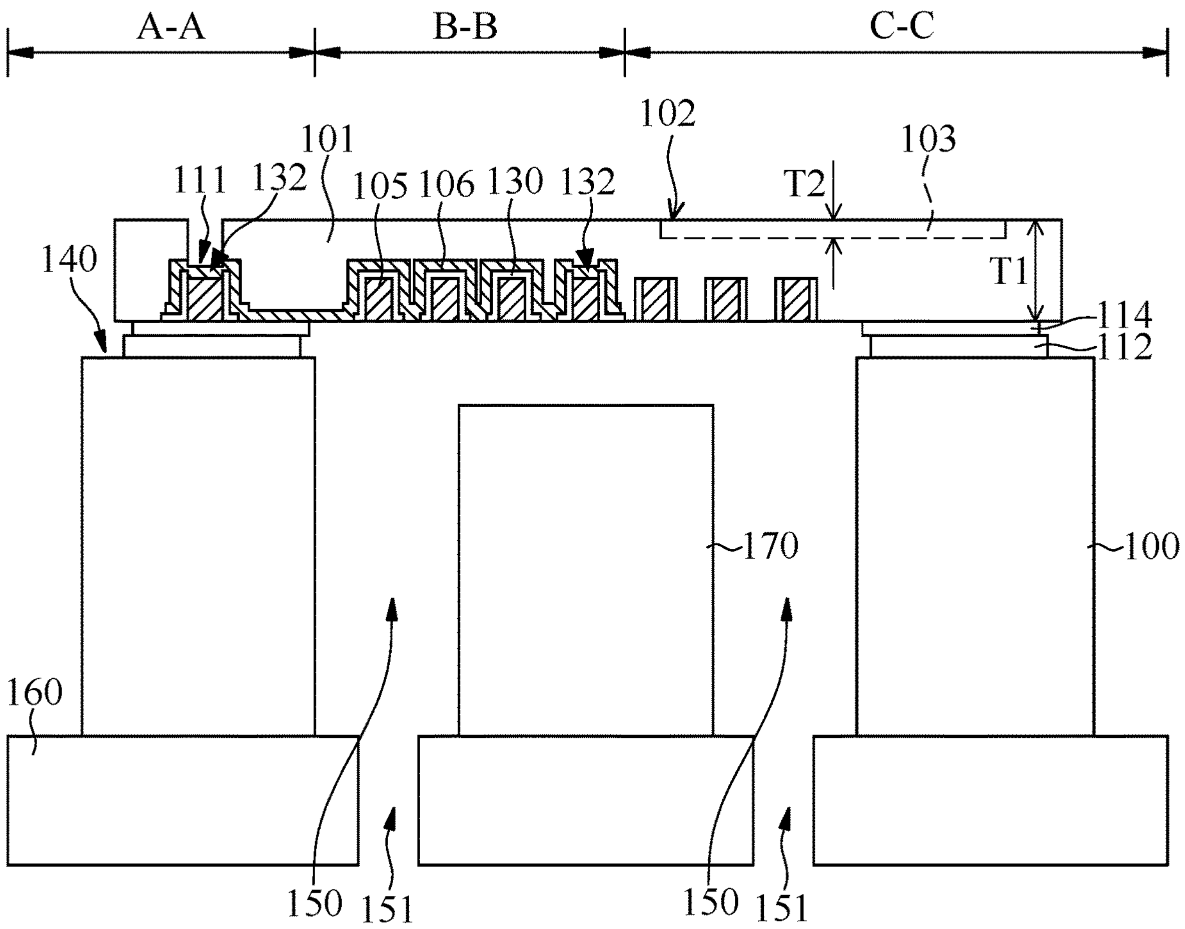

Referring to FIG. 3E, a carrier board 160 is disposed on the bottom surface of the substrate 100. In some embodiments, the carrier board 160 may include a printed circuit board (PCB). The carrier board 160 board includes air holes 151 which allow the hollow chamber 150 to communicate with the external environment. The first permanent magnetic element 170 is disposed on the carrier board 160 and is accommodated in the hollow chamber 150. The first permanent magnetic element 170 is configured to cooperate with the multilayer coil 104 to generate a force toward the normal direction of the substrate 100, and the diaphragm 102 can vibrate relative to the substrate 100 according to the force. In some embodiments, the first permanent magnetic element 170 may include a neodymium iron boron magnet.

Figure 3F:
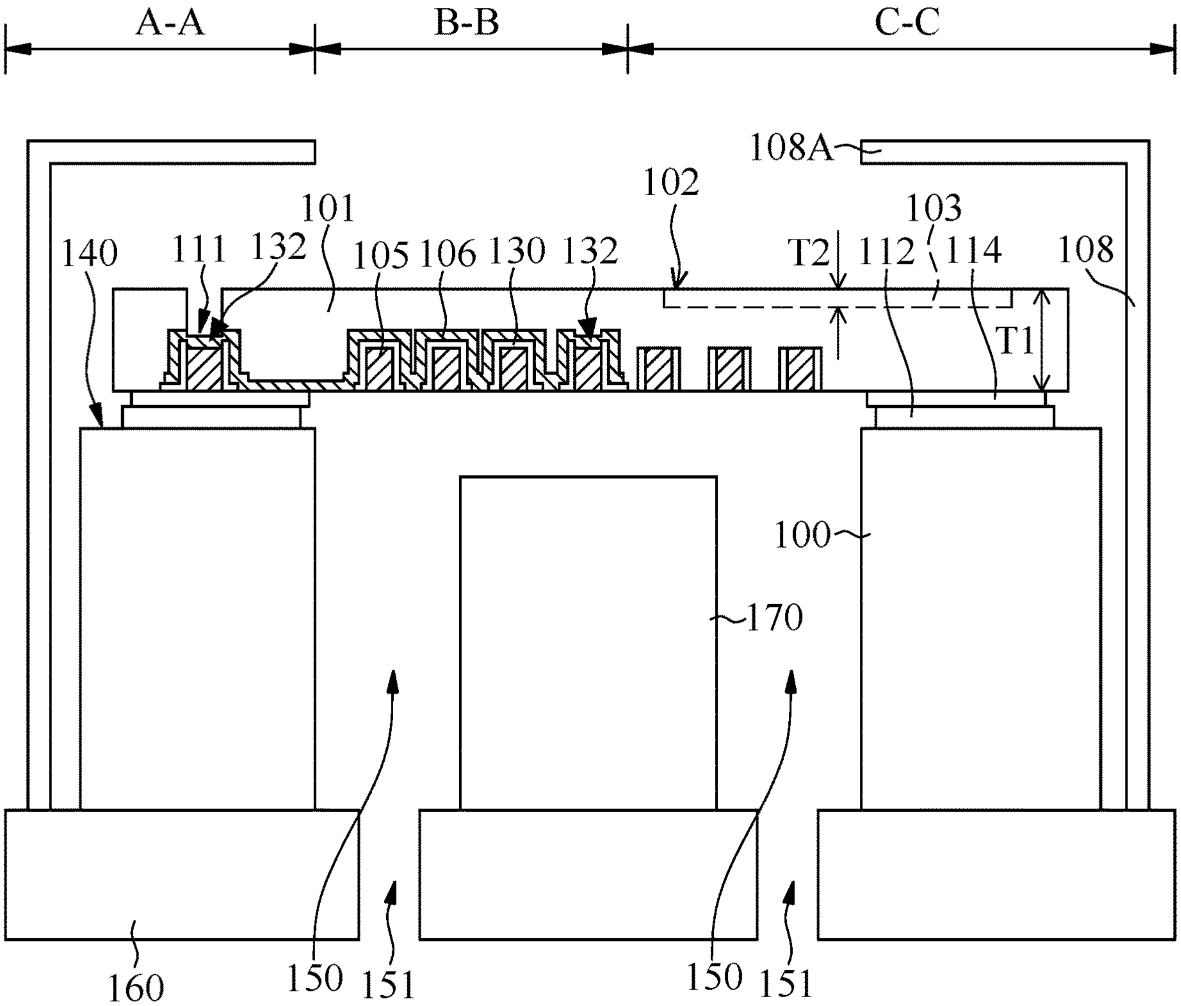

Referring to FIG. 3F, a lid 108 is disposed on the carrier board 160. The lid 108 wraps around the substrate 100 and the diaphragm 102, and the end 108A of the lid 108 exposes a portion of the top surface of the diaphragm 102. In some embodiments, the lid may include metals with lower magnetic permeability than $1.25\times10^{-4}$ H/mm, such as gold (Au), copper (Cu), aluminum (Al), or a combination thereof.

Figure 4A:
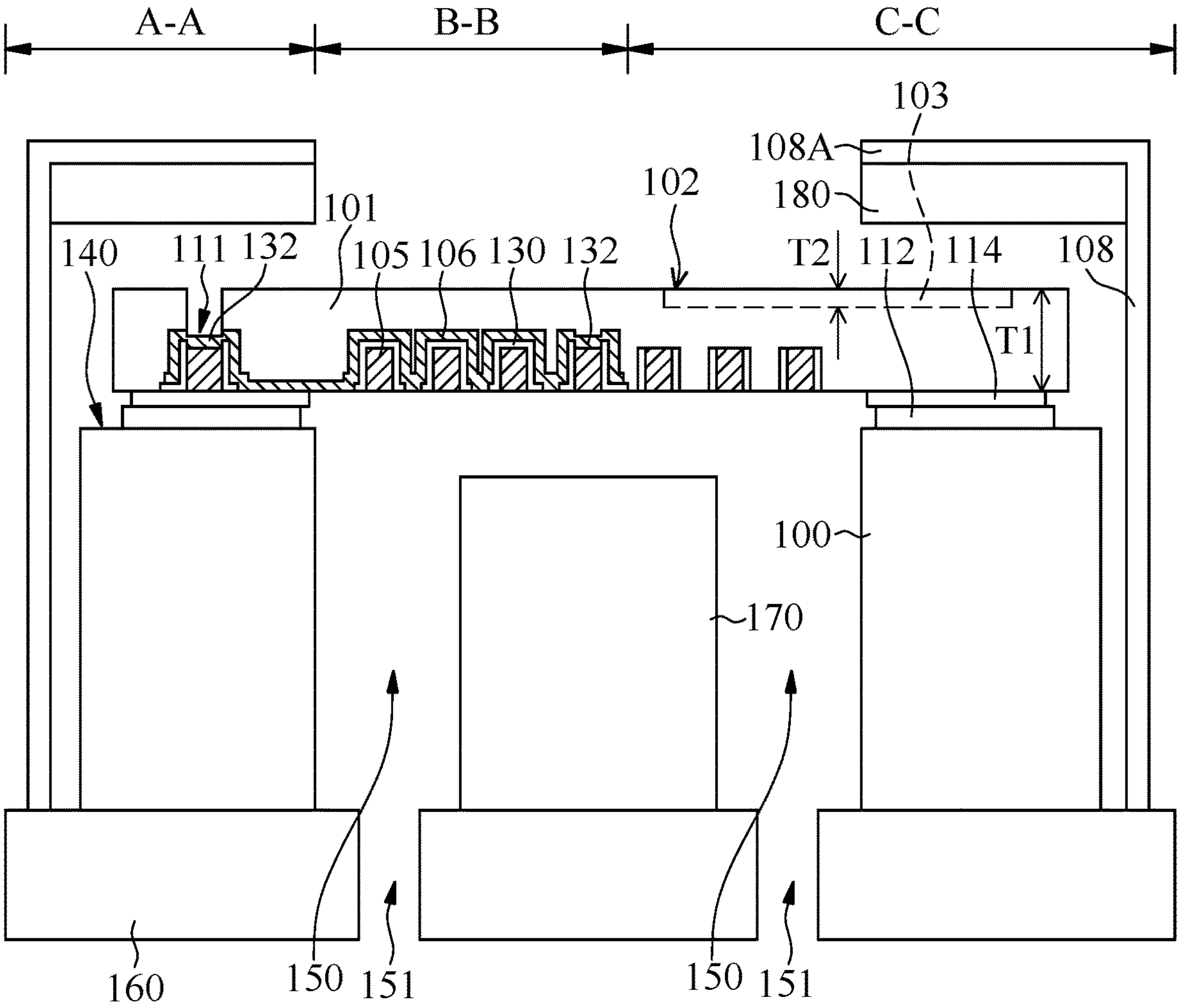
FIG. 4A illustrates a cross-sectional view of an exemplary package structure of a micro speaker according to some embodiments of the present disclosure.
Figure 4B:
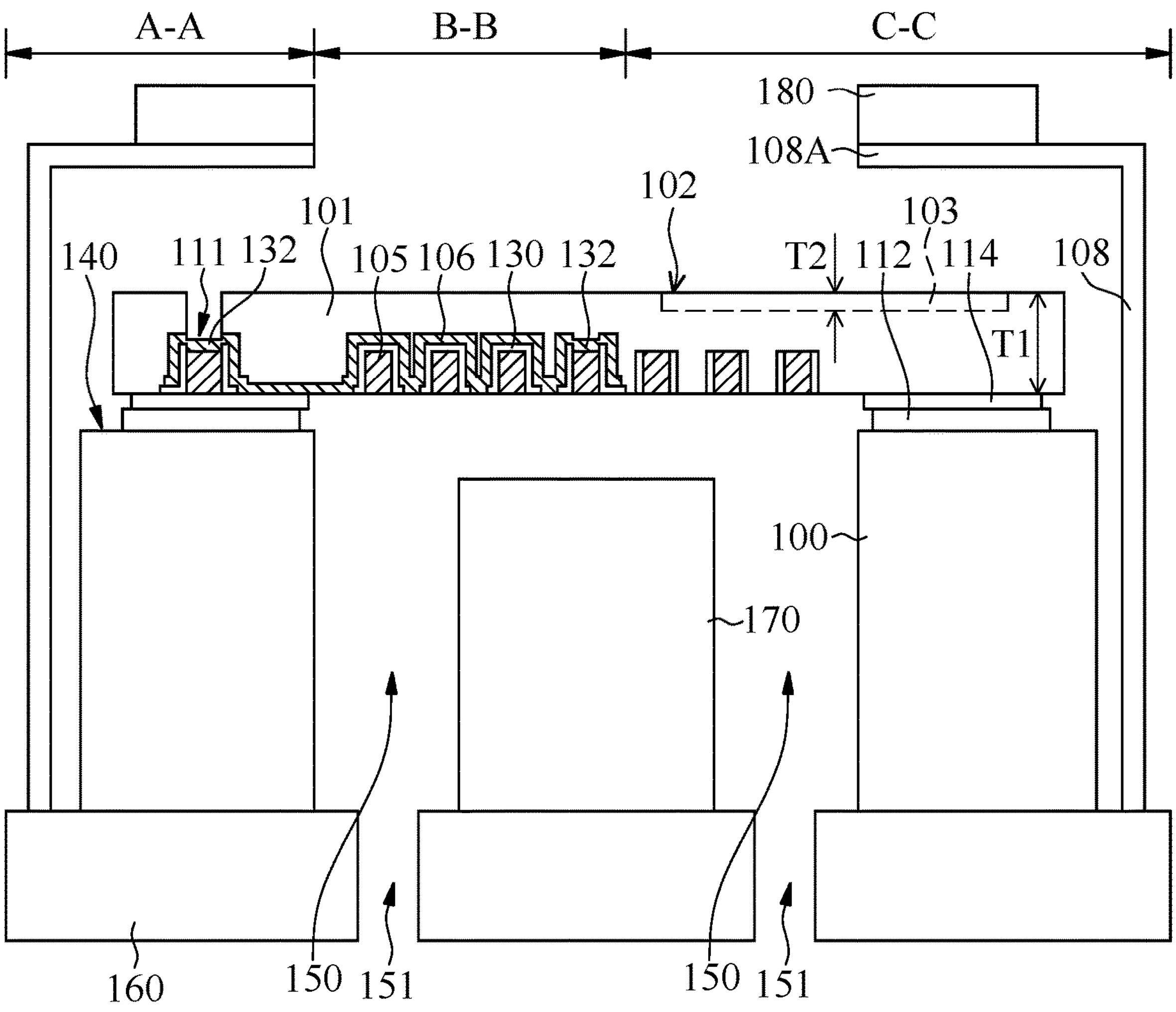
FIG. 4B illustrates a cross-sectional view of an exemplary package structure of a micro speaker according to some embodiments of the present disclosure.

FIG. 4A and FIG. 4B illustrate a cross-sectional views of exemplary package structures of a micro speakers according to some embodiments of the present disclosure. As shown in FIG. 4A and FIG. 4B, a second permanent magnetic element 180 may be disposed on the lid 108, and may be disposed above the diaphragm 102. In some embodiments, the second permanent magnetic element 180 is disposed under the end 108A of the lid. In some embodiments, the second permanent magnetic element 180 is disposed above the end 108A of the lid. The second permanent magnetic element 180 and the first permanent magnetic element 170 attract each other to increase the deflection of the planar magnetic field. The force generated by the current passing through the multilayer coil 104 and the planar magnetic field in the normal direction of the substrate 100 is increased, so that the diaphragm 102 has a better frequency response, thereby improving the performance of the package structure. In some embodiments, the second permanent magnetic element 180 may include a neodymium iron boron magnet.

FIG. 5A to FIG. 5F are top views of the diaphragms 102A, 102B, 102C, 102D, 102E, and 102F according to some embodiments of the present disclosure. The diaphragms 102A, 102B, 102C, 102D, 102E, and 102F may replace the diaphragm 102 in the package structure 10 of the micro speaker. The diaphragms 102A, 102B, 102C, 102D, 102E, and 102F may include different etching patterns to change the characteristics of the diaphragms. A first axis 201 and a second axis 202 perpendicular to each other is used for describe the diaphragms below. In some embodiments, the central axis O may pass through an intersection 200 of the first axis 201 and the second axis 202.

Figure 5A:
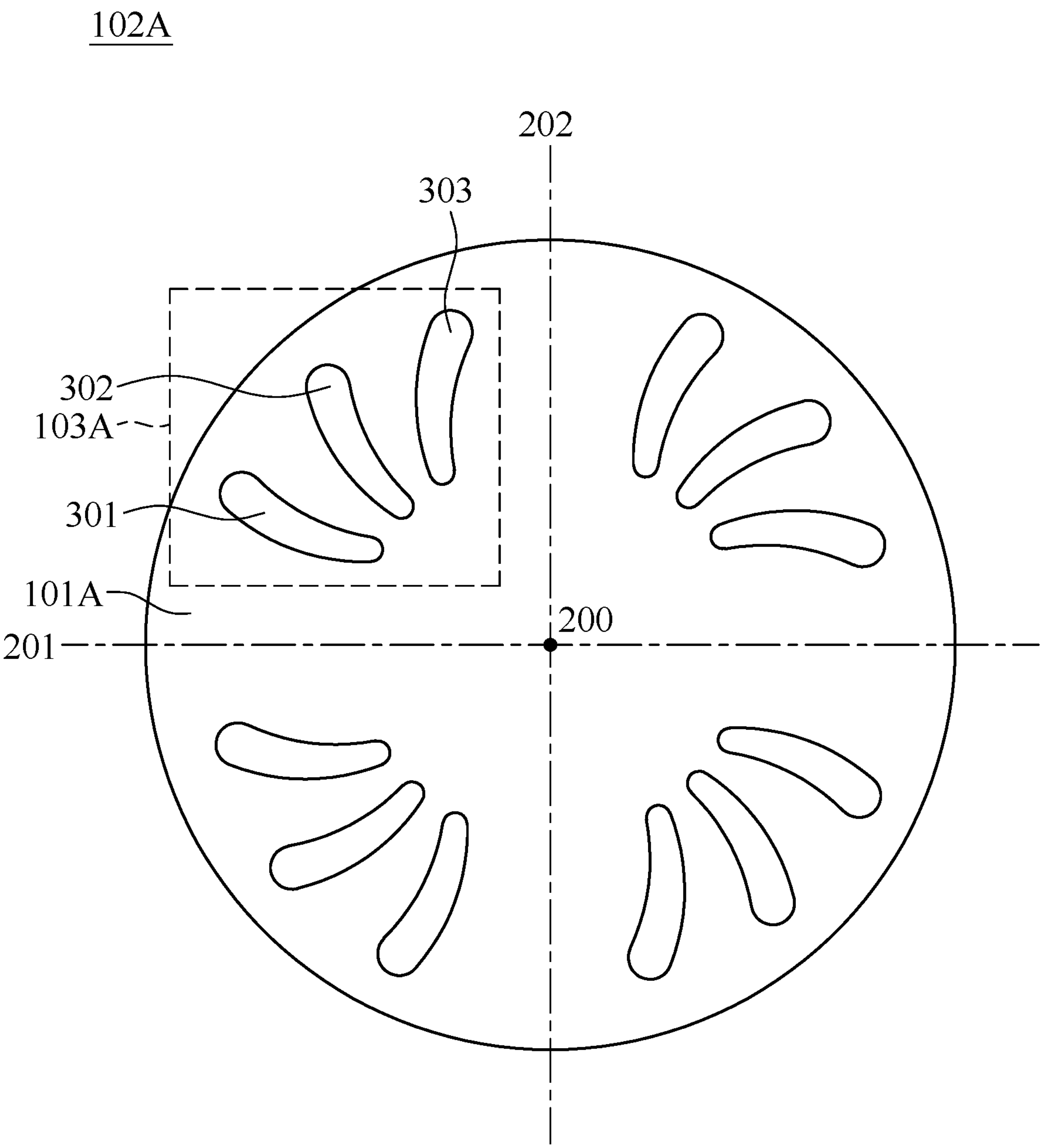
FIG. 5A to FIG. 5F are top views of the diaphragms according to some embodiments of the present disclosure.

In some embodiments, as shown in FIG. 5A, the main body 101A of the diaphragm 102A may have multiple groups of the etching patterns 103A. Each etching pattern 103A may include pattern units 301, 302, and 303. The pattern units 301, 302, and 303 may have shaped such as teardrop-shaped or slit-shaped, etc. It should be noted that the shapes are only for illustration, and the shapes of the pattern units may be adjusted based on actual requirement. In some embodiments, the diaphragm 102A may be separated by the first axis 201 and the second axis 202 as four quadrants, and each of the quadrants may have one etching pattern 103A. The etching patterns 103A in different quadrants may be rotational symmetrical relative to the intersection 200. In other words, one of the etching patterns 103A may overlap another etching pattern 103A when rotating relative to the intersection 200 in a certain angle (e.g. 90 degrees). Therefore, the stress on the diaphragm 102A in different angles may be balanced to achieve a better vibration, so the sensitivity of the package structure 10 of the micro speaker may be increased.

Figure 5B:
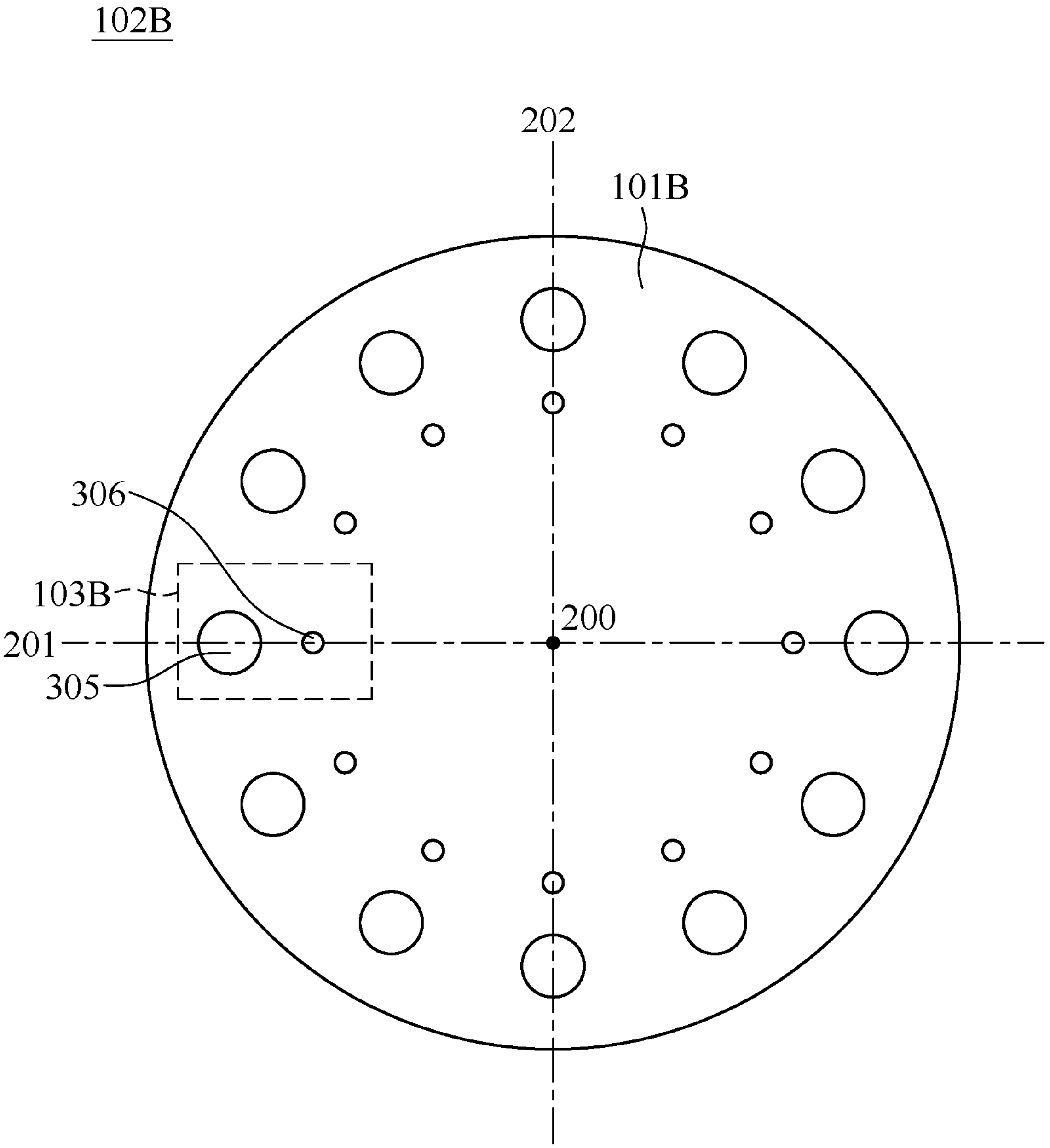

In some embodiments, as shown in FIG. 5B, the main body 101B of the diaphragm 102B may have multiple groups of the etching patterns 103B. Each etching pattern 103B may include pattern units 305 and 306. The pattern units 305 and 306 may be circular, may arrange in a radius direction of the diaphragm 102B, and may have different sized (e.g. diameter). In some embodiments, a distance between the pattern unit 305 and the intersection 200 may be greater than a distance between the pattern unit 306 and the intersection 200, and the size of the pattern unit 305 may be e greater than the size of the pattern unit 306 to adjust the stress in different positions of the diaphragm 102B. Moreover, the etching patterns 103B may be rotational symmetrical relative to the intersection 200 to balance the stress on the diaphragm 102B in different angles for a better vibration, so the sensitivity of the package structure 10 of the micro speaker may be increased.

Figure 5C:
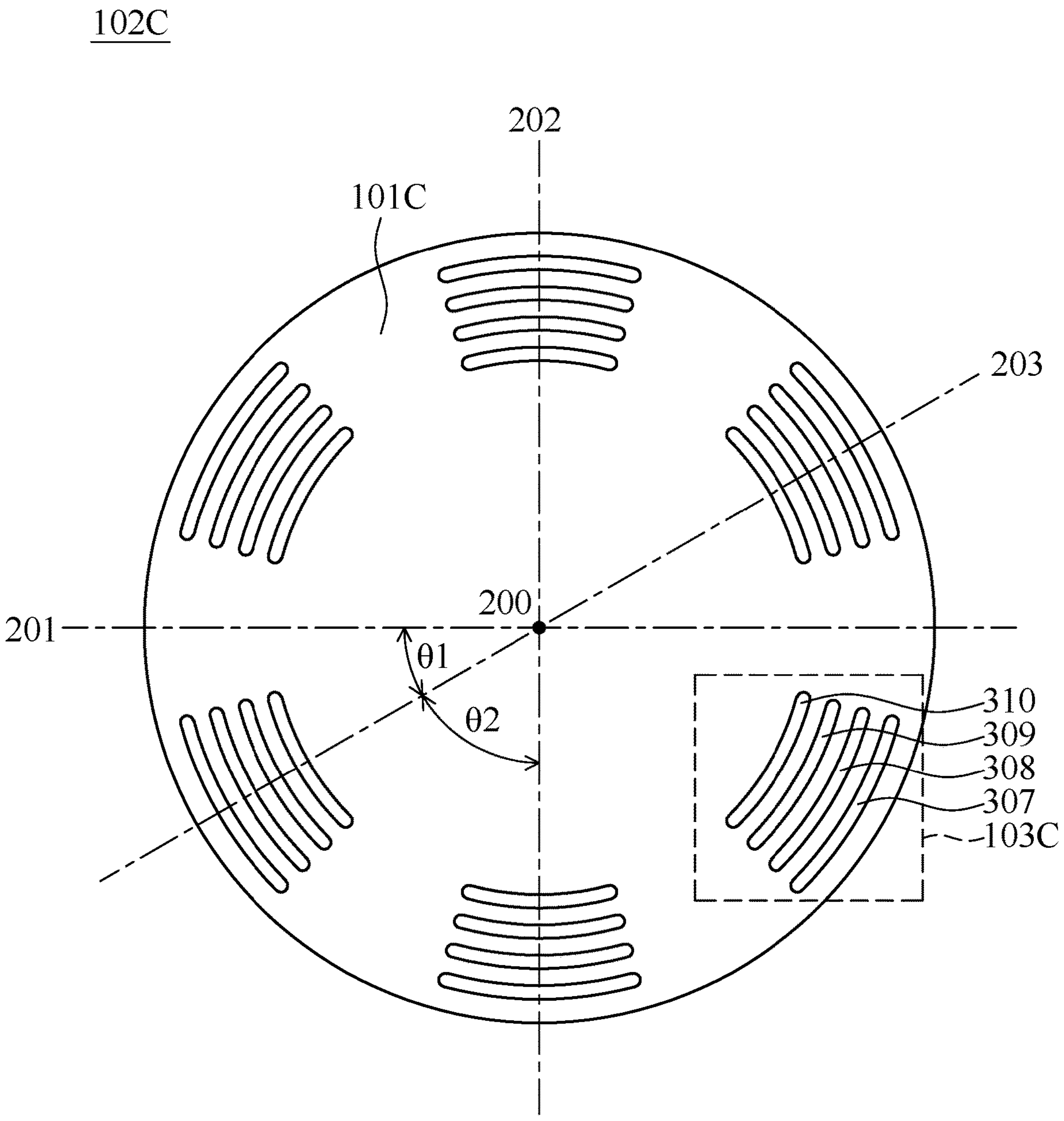

In some embodiments, as shown in FIG. 5C, the main body 101C of the diaphragm 102C may have multiple groups of the etching patterns 103C. Each etching pattern 103C may include pattern units 307, 308, 309, and 310. The pattern units 307, 308, 309, and 310 may be curved or slit-shaped. In some embodiments, the pattern units 307, 308, 309, and 310 may be sequentially arranged in a radius direction of the diaphragm 102C, wherein the pattern unit 307 is farther away from the intersection, and the pattern unit 310 is closer to the intersection. In some embodiments, the pattern units 307, 308, 309, and 310 may be arcs with the intersection 200 as their center of circle, and the pattern units 307, 308, 309, and 310 may have different lengths. For example, since a length of an arc equals to a radius of the arc times the central angle of the arc, the pattern units 307, 308, 309, and 310 may have substantially identical central angle, so the lengths of the pattern units 307, 308, 309, and 310 may be gradually decreased.

In some embodiments, the second axis 202 may pass through two etching patterns 103C, and a third axis 203 may pass through another two etching patterns 103C, and the second axis 202 and the third axis 203 may be not perpendicular or parallel to each other. In some embodiments, an angle θ1 is between the first axis 201 and the third axis 203, an angle θ2 is between the second axis 202 and the third axis 203, and the angle θ1 is different from the angle θ2. For example, the angle θ1 may be about 30 degrees, and the angle θ2 may be about 60 degrees, but the present disclosure is not limited thereto. In some embodiments, the etching patterns 103C may be rotational symmetrical relative to the intersection 200 to balance the stress of the diaphragm 102C, so the sensitivity of the package structure 10 of the micro speaker may be increased.

Figure 5D:
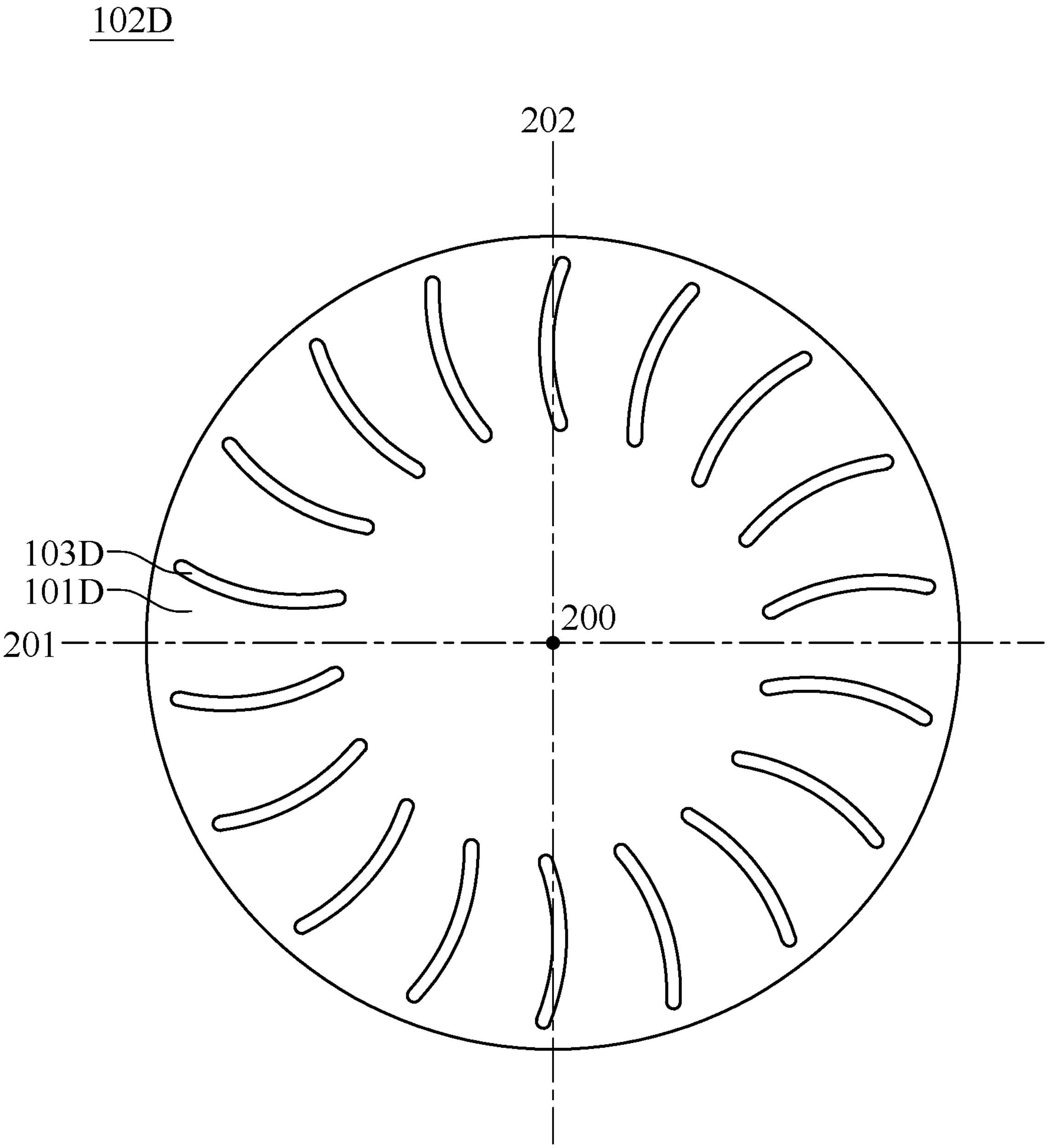

In some embodiments, as shown in FIG. 5D, the main body 101D of the diaphragm 102D may have etching patterns 103D. The etching patterns 103D may be curved or slit-shaped, and may be rotational symmetrical relative to the intersection 200 to balance the stress of the diaphragm 102D, so the sensitivity of the package structure 10 of the micro speaker may be increased.

Figure 5E:
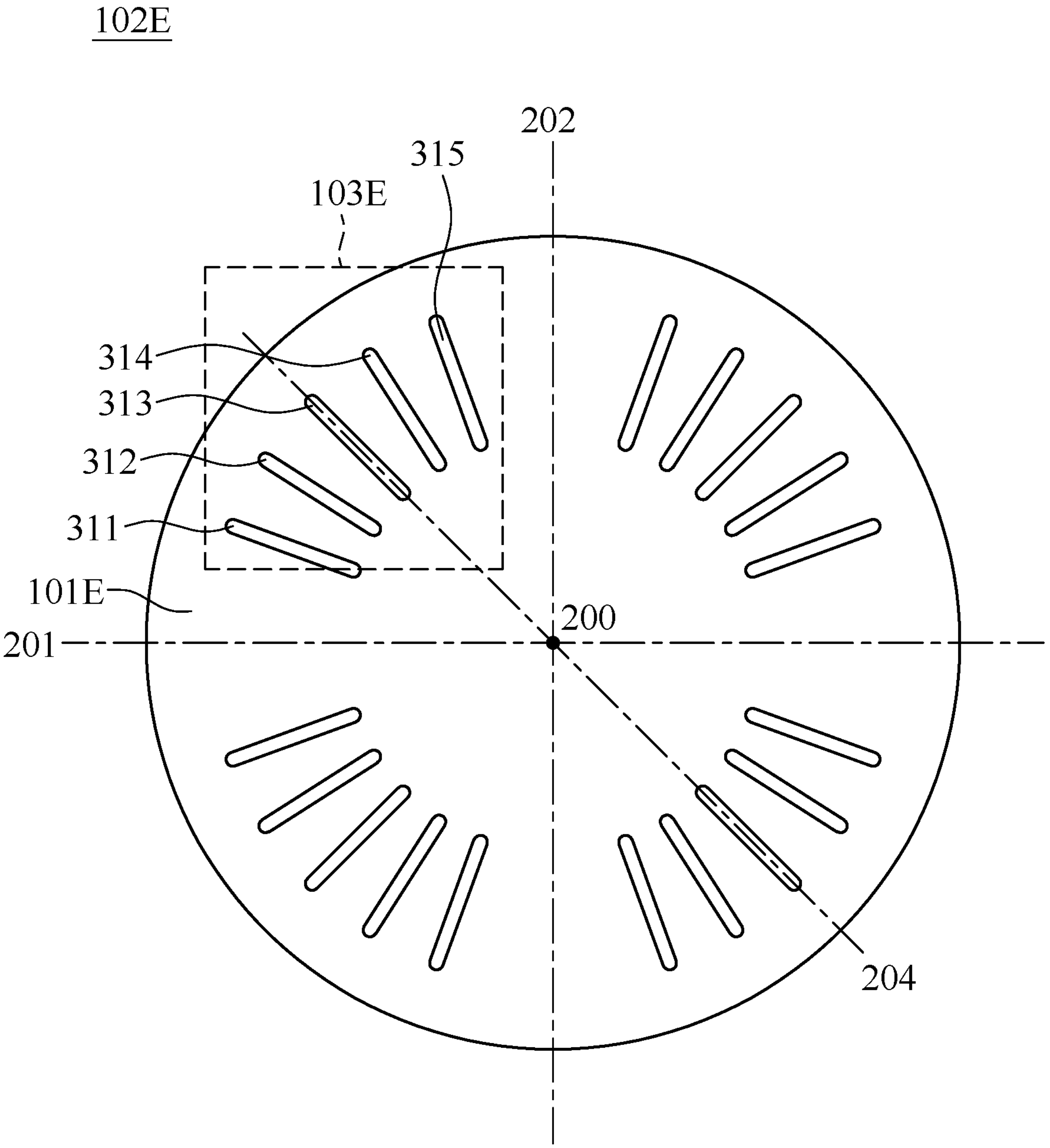

In some embodiments, as shown in FIG. 5E, the main body 101E of the diaphragm 102E may have multiple groups of the etching patterns 103E. Each etching pattern 103E may include pattern units 311, 312, 313, 314, and 315. The pattern units 311, 312, 313, 314, and 315 may be strip-shaped or slit-shaped. In some embodiments, the pattern units 311, 312, 313, 314, and 315 may arrange in radius directions of the diaphragm 102E, and may have substantially identical lengths. In some embodiments, each quadrant defined by the first axis 201 and the second axis 202 may have an etching pattern 103E, and the etching patterns 103E in different quadrants may be rotational symmetric to the intersection 200. In other words, one of the etching patterns 103E may overlap another etching pattern 103E when rotating relative to the intersection 200 in a certain angle (e.g. 90 degrees). Moreover, the etching patterns 103E may be mirror symmetric to the first axis 201, the second axis 202, or a fourth axis 204. Angles between the first axis 201 and the fourth axis 204 and between the second axis 202 and the fourth axis 204 may be about 45 degrees. Therefore, the stress on the diaphragm 102E in different angles may be balanced to achieve a better vibration, so the sensitivity of the package structure 10 of the micro speaker may be increased.

Figure 5F:
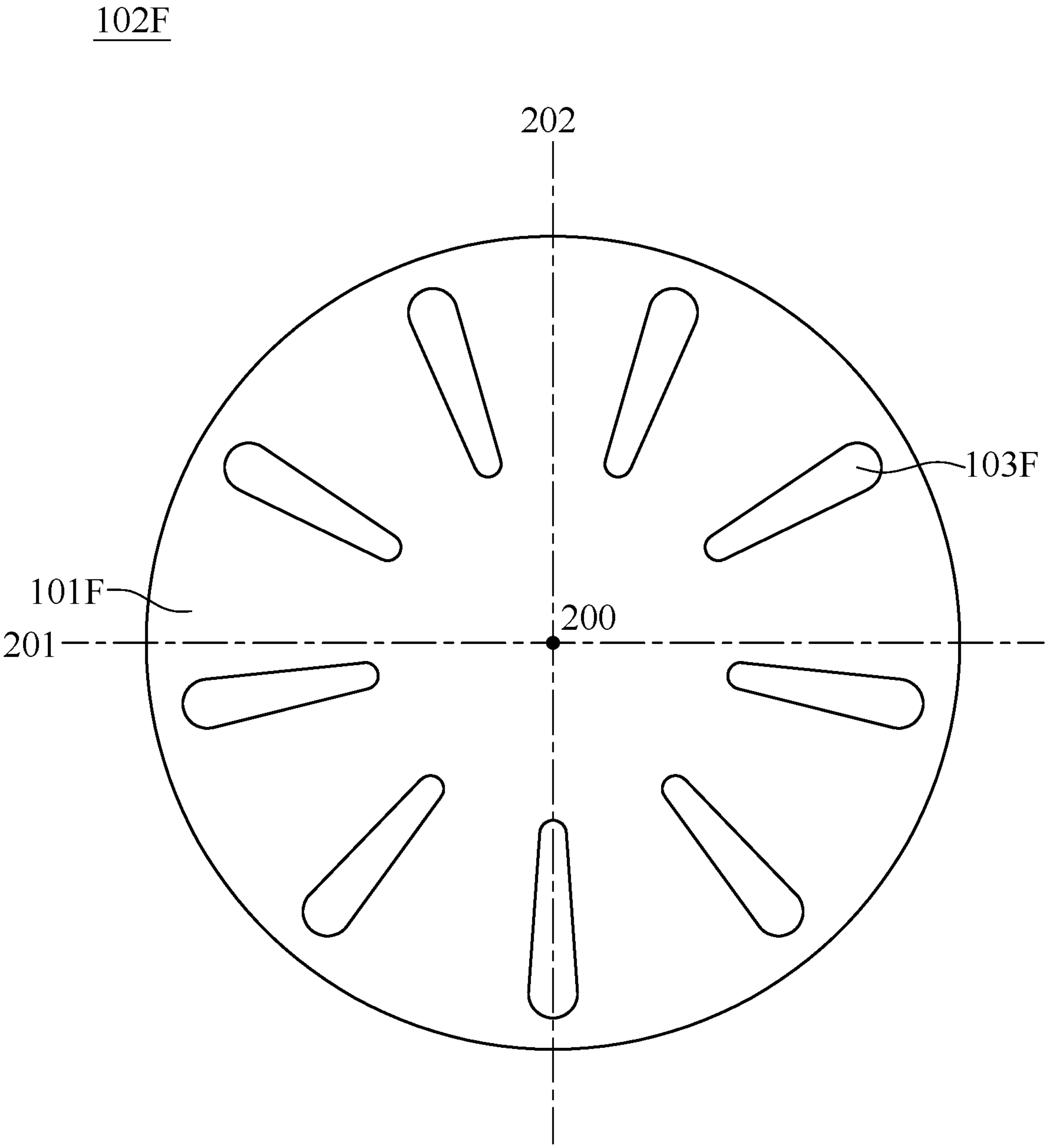

In some embodiments, as shown in FIG. 5F, the main body 101F of the diaphragm 102F may have etching patterns 103F. The etching patterns 103F may extend in radius directions of the diaphragm 102F, and the width of the etching pattern 103F may increase in a direction away from the intersection 200. The etching patterns 103F may be rotational symmetric to the intersection 200 to balance the stress of the diaphragm 102F in different angles, so the sensitivity of the package structure 10 of the micro speaker may be increased.

In summary, a package structure of a micro speaker is provided. The package structure includes a substrate having a hollow chamber, a diaphragm suspended over the hollow chamber, a coil embedded in the diaphragm, a carrier board disposed on the bottom surface of the substrate, a first permanent magnetic element disposed on the carrier board and in the hollow chamber, and a lid wrapped around the substrate and the diaphragm. The diaphragm includes an etching pattern. One end of the lid exposes a portion of the top surface of the diaphragm. Therefore, the stress on the diaphragm in different positions may be balanced to achieve better performance.

In addition, the coil is formed on the semiconductor wafer and covered with the diaphragm, so that the coil is embedded in the diaphragm. It can reduce the difficulty of the manufacturing process, and prevent the connection points of the multilayer coil from being broken due to long-term vibration, thereby improving the reliability of the product. Furthermore, due to the use of micro electromechanical process technology, the package structure of the micro speaker of the present disclosure has the advantages of batch production, high consistency, high yield, small area, and low cost.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A package structure of a micro speaker, comprising:

a substrate having a hollow chamber;

a polymer diaphragm suspended over the hollow chamber and being electrically insulating, wherein the polymer diaphragm comprises etching patterns recessed from a first surface of the polymer diaphragm and a cutting channel formed on and formed to the substrate and around the polymer diaphragm, wherein the etching patterns are smooth and symmetrical relative to an intersection in a top view;

a coil embedded in the polymer diaphragm and being separated from the etching patterns by the polymer diaphragm, wherein the coil comprises a first layer and a second layer, the first layer partially overlaps the second layer, and the first layer and the second layer are embedded in the polymer diaphragm;

at least one dielectric layer disposed between the polymer diaphragm and the substrate;

a carrier board disposed on a bottom surface of the substrate;

a first permanent magnetic element disposed on the carrier board and in the hollow chamber, wherein the first surface faces away from the first permanent magnetic element; and a lid wrapped around the substrate and the polymer diaphragm, wherein an end of the lid exposes a portion of a top surface of the polymer diaphragm;

wherein the polymer diaphragm is made of a material different from the at least one dielectric layer.

2. The package structure of the micro speaker as claimed in claim 1, wherein the polymer diaphragm comprises polydimethylsiloxane (PDMS), phenolic epoxy resin, polyimide, or a combination thereof.

3. The package structure of the micro speaker as claimed in claim 1, wherein the polymer diaphragm is light-sensitive.

4. The package structure of the micro speaker as claimed in claim 1, wherein the polymer diaphragm is not light-sensitive.

5. The package structure of the micro speaker as claimed in claim 1, wherein the carrier board comprises an air hole, and the air hole allows the hollow chamber to communicate with an external environment.

6. The package structure of the micro speaker as claimed in claim 1, wherein the lid comprises a metal with magnetic permeability lower than 1.25×10-4H/m.

7. The package structure of the micro speaker as claimed in claim 1, further comprising a second permanent magnetic element disposed under the end of the lid.

8. The package structure of the micro speaker as claimed in claim 1, wherein the polymer diaphragm has a Young's modulus of between 1 MPa and 100 GPa.

9. The package structure of the micro speaker as claimed in claim 1, wherein the polymer diaphragm has a thickness of between 0.1 μm and 20 μm.

10. The package structure of the micro speaker as claimed in claim 1, wherein the coil comprises a first metal layer and a second metal layer, and the first metal layer is electrically connected to the second metal layer in an opening of the polymer diaphragm.

11. The package structure of the micro speaker as claimed in claim 10, wherein the first metal layer and the second metal layer each comprises aluminum silicon, aluminum, copper, or a combination thereof.

12. The package structure of the micro speaker as claimed in claim 10, wherein a width of the first metal layer and a width of the second metal layer are between 1 μm and 500 μm, and a thickness of the first metal layer and a thickness of the second metal layer are between 0.1 μm and 20 μm.

13. The package structure of the micro speaker as claimed in claim 10, wherein the first metal layer comprises a spiral structure surrounding a central axis of the polymer diaphragm, and the second metal layer crosses the spiral structure and is electrically connected to the first metal layer.

14. The package structure of the micro speaker as claimed in claim 1, wherein the shape of the etching pattern comprises teardrop-shaped or slit-shaped.

15. The package structure of the micro speaker as claimed in claim 14, wherein a thickness of the etching pattern is less than a thickness of the polymer diaphragm.

16. A package structure of a micro speaker, comprising:

a substrate having a hollow chamber;

a diaphragm suspended over the hollow chamber, wherein the diaphragm comprises an etching pattern recessed from a first surface of the diaphragm and a cutting channel formed on the substrate and around the diaphragm, wherein the etching patterns are smooth and symmetrical relative to a first intersection and a second intersection in a top view, wherein the first intersection is perpendicular to the second intersection;

a coil embedded in the diaphragm and comprising a first metal layer, a second metal layer, and a first dielectric layer separating the first metal layer and the second metal layer;

at least one second dielectric layer disposed between the diaphragm and the substrate, wherein the diaphragm is made of a material different from the first dielectric layer and the second dielectric layer;

an etch stop layer overlapping at least a portion of the first metal layer and the second metal layer;

a carrier board disposed on a bottom surface of the substrate;

a first permanent magnetic element disposed on the carrier board and in the hollow chamber, wherein the first surface faces away from the first permanent magnetic element; and a lid wrapped around the substrate and the diaphragm, wherein an end of the lid exposes a portion of a top surface of the diaphragm.

17. The package structure of the micro speaker as claimed in claim 16, wherein a top surface of the substrate facing the diaphragm is partially exposed from the second dielectric layer.

18. A package structure of a micro speaker, comprising:

a substrate having a hollow chamber;

a diaphragm suspended over the hollow chamber, wherein the diaphragm comprises an etching pattern recessed from a first surface of the diaphragm and a cutting channel formed on the substrate and around the diaphragm, wherein the etching patterns are smooth and symmetrical relative to an intersection in a top view;

a coil embedded in the diaphragm, wherein the coil comprises a first metal layer and a second metal layer, the first metal layer is covered by the diaphragm, and a top surface of the second metal layer is exposed from an opening of the diaphragm, wherein the top surface of the second metal layer is between the first surface and a second surface of the diaphragm opposite from the first surface;

a first dielectric layer and a second dielectric layer disposed between the diaphragm and the substrate, wherein the first dielectric layer and the second dielectric layer are not exposed from the diaphragm in a top view, and the diaphragm is made of a material different from the first dielectric layer and the second dielectric layer;

a carrier board disposed on a bottom surface of the substrate;

a first permanent magnetic element disposed on the carrier board and in the hollow chamber, wherein the first surface faces away from the first permanent magnetic element;

a lid wrapped around the substrate and the diaphragm, wherein an end of the lid exposes a portion of a top surface of the diaphragm; and a second permanent magnetic element disposed on the lid of the diaphragm.

19. The package structure of the micro speaker as claimed in claim 18, wherein a first sidewall of the first dielectric layer is misaligned with a second sidewall of the second dielectric layer.

20. The package structure of the micro speaker as claimed in claim 18, wherein the first dielectric layer and the second dielectric layer have different etching rates.

* * * * *